June 8, 1926.
J. J. ALTHAUSEN
RAT TRAP
Filed Sept. 5, 1924
1,587,494
2 Sheets-Sheet 1
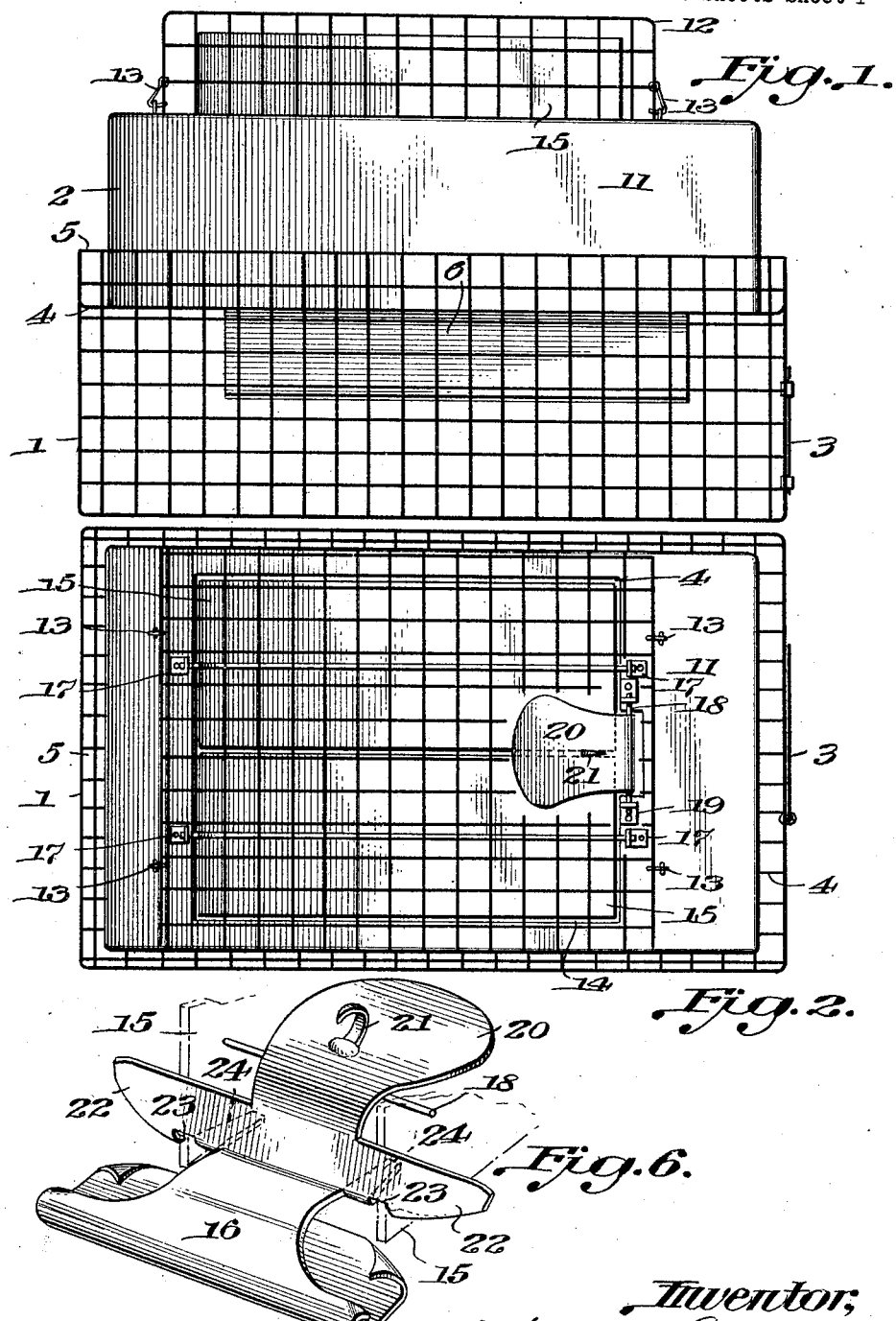

June 8, 1926.  J. J. ALTHAUSEN  1,587,494
RAT TRAP
Filed Sept. 5, 1924  2 Sheets-Sheet 2
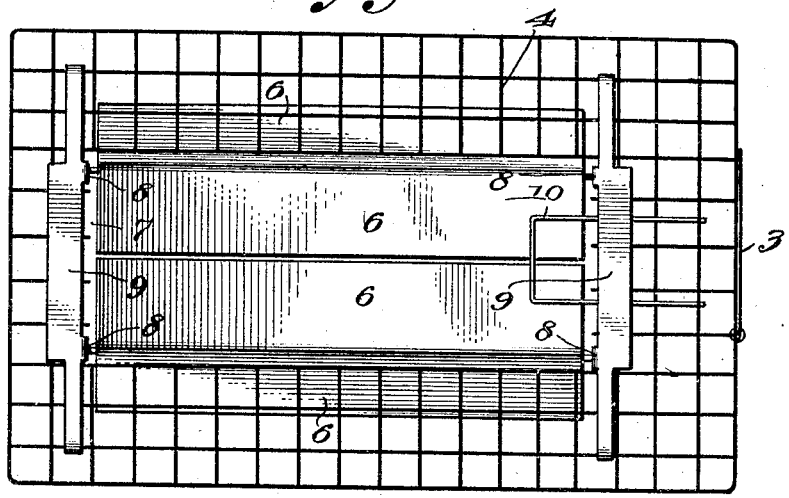
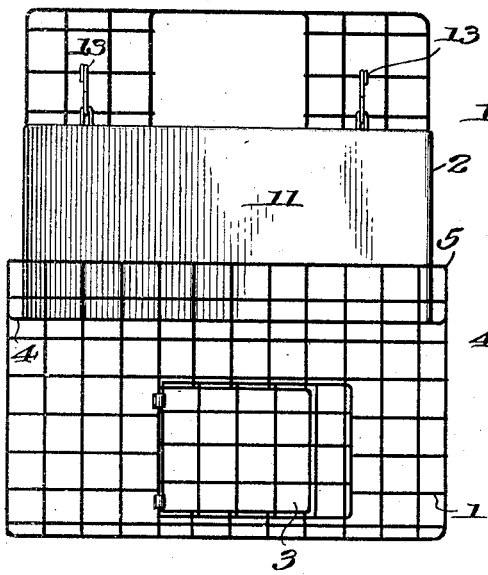
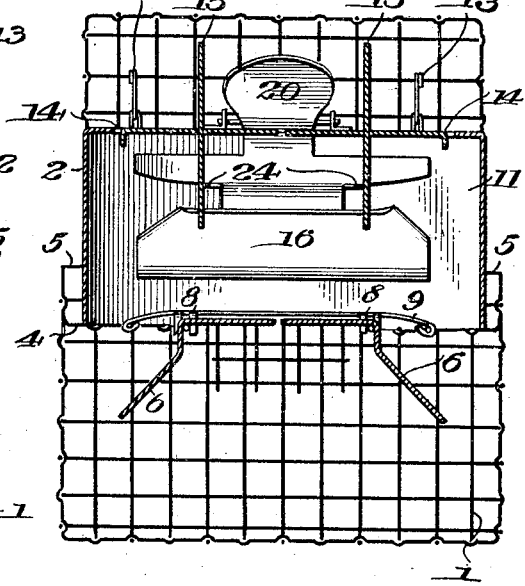

Patented June 8, 1926.

1,587,494

UNITED STATES PATENT OFFICE.

JOHAN J. ALTHAUSEN, OF EVANSVILLE, INDIANA.

RAT TRAP.

Application filed September 5, 1924. Serial No. 736,069.

This invention relates to rat traps of that general class wherein the rodent enters an upper compartment or chamber of the trap and is precipitated into a lower chamber thereof from which escape is impossible.

My object is to improve traps of this general class by the provision of novel revolving trap doors for the upper section or compartment of the trap, and a novel trigger or pan for holding said doors in immovable arrangement until the animal releases them by nibbling the bait, said trap doors and trigger being combined in an improved manner.

Another object is to provide an improved arrangement of trap doors for the lower section or compartment which will prevent the escape of the rats upwardly from said lower compartment.

A still further object is to combine the upper and lower sections or compartments of the trap in such manner that they are securely connected together and yet may be readily detached for rebaiting or cleaning.

The improved revolving trap doors are of such construction that when the trap is baited and set, a runway is provided, insuring that the rat directly approach the bait on the trigger instead of being permitted to approach it by a circuitous route which would interfere with springing of the trap when the bait is nibbled; further, these trap doors are so constructed that they close down over the rat when he springs the trigger and they thus prevent him from holding himself up in the upper part of the trap and, consequently, escaping.

I am aware that modifications may be resorted to in embodying my improvement in a practical and effective trap without materially changing the construction and cooperation of the parts entering into the trap; therefore, limitation is not made to details of construction except where specified in the claim.

In the accompanying drawings:

Figure 1 is a side elevation of the complete trap.

Fig. 2 is a plan view thereof.

Fig. 3 is a plan view of the lower section alone.

Fig. 4 is an end elevation of the complete trap.

Fig. 5 is a vertical section taken just in front of the trigger or pan; and

Fig. 6 is a detail perspective view of the trigger or pan in full lines, dotted lines representing parts of the blades of the revolving trap doors which are held by said trigger.

The trap consists of a lower section 1 and an upper section 2. The lower section 1 may be of wire and provided with a suitable exit door 3 having any desired latch or fastener, this door being used for removing the rats which have been caught.

The lower section or compartment 1 is closed on all sides, including its top 4, but a retaining wall or fence 5 rises above the top 4 to receive the upper section 2 and prevent it from becoming displaced.

The top 4 of the lower section is provided with doors 6 having depending parts, as shown in Fig. 5. The doors 6 normally close an opening 7, Fig. 3, extending lengthwise of the trap and of a sufficient length to allow the rat to fall through said opening and, while passing downwardly, to depress the horizontal parts of the doors. The depending parts of the doors strike against the top 4, when the rat descends, and thus limit the downward swinging of the doors. The doors are hinged by pintles or rods 8 in metal clips or pieces 9 secured to the top 4.

Any suitable means may be provided to prevent the door 6 from swinging upwardly as, for instance, a limiting bail-shaped piece of wire 10, Fig. 3, secured to the top 4. Thus, once the rat descends into the lower section or compartment 1, it is impossible for him to escape except when the door 3 is open.

The upper part or section 2 of the trap has a sheet metal wall 11 for its lower part and for so much of its upper part as is not open. By employing sheet metal, the rat is prevented from seeing that there is any connection or opening between the upper part of the trap and the lower part thereof.

Surmounting the metal part 11 of the section 2 is the wire top 12 which is connected to the sheet metal part 11 by any suitable hooks or catches 13. Thus, the top or upper part 12 is made readily detachable so that access may be had to the revolving trap doors and the pan or trigger now to be described.

The greater part of the top of the sheet metal section 11 is open or cut out as shown at 14, such opening being rectangular.

The opening 14 is filled or, in effect, closed, by revolving trap doors 15 which are duplicates, said doors being of bladed paddle wheel construction as shown more clearly in Fig. 5. By preference, these revolving trap doors 15 are four-bladed so that their horizontal parts substantially fill or close the opening 14 whereas their vertical parts are arranged, partly above the sheet metal section 11 and within the wire section 12. The depending parts of the vertically arranged blades are within the chamber formed by the sheet metal section 11.

The trigger or pan which is shown most clearly in Figs. 5 and 6 at 16, cooperates with the revolving paddle wheel trap doors 15 in such manner that these doors cannot turn in one direction or the other when the trigger is set. Consequently, when the trap is set, the rodent has presented to his view a runway formed by the upper parts of the vertically arranged paddles or vanes, which directly lead him to the bait and he has no opportunity of taking a circuitous route to reach the bait nor can he climb over the upper edges of the vertically arranged vanes. This insures that the rat will walk onto the inner, adjacent, horizontal parts of the vanes when approaching the bait. Consequently, when the bait is nibbled and the trigger is sprung, the weight of the rat causes the revolving trap doors to turn, thus precipitating the rodent onto the doors 6 which, in turn, yield, and he then descends into the lower section 1 where he is securely retained.

The revolving trap doors 15 are provided with shafts or trunnions 17 which are suitably journaled in bearings on the upper part of the sheet metal section 11 as shown most clearly in Fig. 2.

The trigger or pan 16 is provided with a shaft 18 journaled at 19 in suitable bearings on the top of the sheet metal section 11. The pan part of the trigger appears at 20, being provided with a hook 21 to which the bait may be secured. The trigger has laterally extending arms 22 which are provided with notches 23 and with projections or lugs 24. The notches 23 receive the rear edges of the vertically arranged vanes of the revolving trap doors 15 as shown in Fig. 6, and the lugs 24 lie against the inner faces of said vanes. The lugs 24 prevent the rat from escaping into the section 12 by jumping upwardly because they block the trap doors against rotating in the opposite direction to that in which they are intended to rotate, even when the notches 23 are freed from the edges of the doors.

The trap having been baited and set, when the rat, having walked along the inner, horizontal, parts of the revolving trap doors, nibbles the bait, he depresses the pan 20 which causes the notches 23 to disengage from the vanes of the trap doors. The weight of the rodent then causes the trap doors to revolve, precipitating the animal onto the doors 6 which, in turn, yield, allowing him to descend into the lower section 1. Should the rat not land squarely on the doors 6, he will eventually step on them and descend into the section 1.

The trigger 16 is weighted or so formed that it will normally swing to engage the trap doors.

I claim:

In an animal trap, the combination with an enclosure or compartment, of a floor therefor comprising rotatably mounted trap doors of paddle wheel form whose axes of rotation are arranged parallel, each trap door having one blade arranged laterally and constituting a continuation of a blade of the other trap door, and having a blade arranged upright, said blades collectively forming a runway having a bottom and side walls along which the animal must pass, the entrance end of the runway being accessible only through one end of the enclosure or compartment, and a bait holding trigger located in the region of the other end of the runway so as to be accessible to the animal only when he has passed into said runway, said bait holding trigger serving to normally lock the trap doors and to release them when moved, means being provided on the trigger to prevent the trap doors from being drawn backwardly after the trigger has released said doors to permit the animal to descend past, or through them.

In testimony whereof I affix my signature.

JOHAN J. ALTHAUSEN.